(12) United States Patent
Brenguier

(10) Patent No.: US 12,088,428 B2
(45) Date of Patent: Sep. 10, 2024

(54) BIDIRECTIONAL TRANSMISSION OF ELECTRICAL POWER ALONG WITH DATA OVER A WIRED TELECOMMUNICATIONS NETWORK

(71) Applicant: Schneider Electric Industries SAS, Rueil Malmaison (FR)

(72) Inventor: Jérôme Jean Sébastien Brenguier, L'Albenc (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 112 days.

(21) Appl. No.: 17/798,727

(22) PCT Filed: Jan. 11, 2021

(86) PCT No.: PCT/EP2021/050339
§ 371 (c)(1),
(2) Date: Aug. 10, 2022

(87) PCT Pub. No.: WO2021/170300
PCT Pub. Date: Sep. 2, 2021

(65) Prior Publication Data
US 2023/0084285 A1    Mar. 16, 2023

(30) Foreign Application Priority Data
Feb. 26, 2020 (EP) .................................. 20305184

(51) Int. Cl.
*H04L 12/40* (2006.01)
*H04L 12/10* (2006.01)
*H04L 49/351* (2022.01)

(52) U.S. Cl.
CPC ........ *H04L 12/40045* (2013.01); *H04L 12/10* (2013.01); *H04L 49/351* (2013.01)

(58) Field of Classification Search
CPC .. H04L 12/40045; H04L 12/10; H04L 49/351
See application file for complete search history.

(56) References Cited

U.S. PATENT DOCUMENTS

2006/0117089 A1* 6/2006 Karam ................ H04L 41/0668
709/208
2007/0171690 A1* 7/2007 Apfel ...................... H02M 7/23
363/127

(Continued)

OTHER PUBLICATIONS

International Search Report mailed Mar. 16, 2021 for International Application No. PCT/EP2021/050339, 3 pages.

*Primary Examiner* — Aurel Prifti
(74) *Attorney, Agent, or Firm* — Locke Lord LLP

(57) ABSTRACT

A network interface apparatus includes: a connection portion adapted to connect the interface apparatus to a wired telecommunications network; a rectifier connected to the connection portion; a power distribution bus connected to the rectifier; a first power controller; a second power controller; a first switch coupled to the first power controller and configured to selectively prevent electrical currents from flowing between the connection portion and the power distribution bus, and a second switch and a third switch each respectively coupled to the second power controller and configured to selectively prevent electrical currents from flowing from the power distribution bus to the connection portion, wherein the second switch is connected in parallel with a rectifier element of the rectifier and the third switch is connected in parallel with a second rectifier element of the rectifier.

17 Claims, 13 Drawing Sheets

(56) References Cited

U.S. PATENT DOCUMENTS

| | | | |
|---|---|---|---|
| 2007/0177411 A1* | 8/2007 | Picard | H04L 12/10 363/35 |
| 2007/0263333 A1* | 11/2007 | Apfel | H02H 9/041 361/91.1 |
| 2007/0278857 A1* | 12/2007 | Robbins | H02J 13/00016 307/2 |
| 2008/0294918 A1* | 11/2008 | Dhuyvetter | H04L 12/10 713/310 |
| 2009/0015229 A1* | 1/2009 | Kotikalapoodi | H02M 3/1582 323/285 |
| 2009/0168278 A1* | 7/2009 | Landry | H02H 9/041 361/57 |
| 2010/0223482 A1* | 9/2010 | Diab | G06F 13/4072 713/310 |
| 2014/0185427 A1* | 7/2014 | Ditzel, III | H04L 12/437 370/223 |
| 2015/0019884 A1* | 1/2015 | Huff | H04L 12/10 713/300 |
| 2016/0064938 A1* | 3/2016 | Balasubramanian | H04L 12/10 307/11 |
| 2017/0041153 A1* | 2/2017 | Picard | H04L 12/10 |
| 2017/0118030 A1* | 4/2017 | Love | H04L 12/10 |
| 2018/0068817 A1* | 3/2018 | Geffroy | H01H 47/002 |
| 2018/0241578 A1* | 8/2018 | Upadhyaya | H04L 12/40 |
| 2018/0287484 A1* | 10/2018 | Braginsky | H02J 3/381 |
| 2019/0068479 A1 | 2/2019 | Fu et al. | |
| 2019/0253268 A1 | 8/2019 | Fu et al. | |
| 2023/0134153 A1* | 5/2023 | Yamashita | H02M 3/33584 307/65 |

* cited by examiner

BIDIRECTIONAL TRANSMISSION OF ELECTRICAL POWER ALONG WITH DATA OVER A WIRED TELECOMMUNICATIONS NETWORK

TECHNICAL FIELD

The present invention relates to devices and methods for providing electrical power over wired data telecommunications networks.

BACKGROUND

Many wired telecommunications networks, such as Ethernet-based networks, can be configured to allow a transmission of electrical power between networking devices connected to the network, e.g. between a power source equipment (PSE) and a powered device (PD), in order to remotely power a networking device.

Electrical power can be transferred throughout the network over the data-carrying physical layer (e.g., Ethernet cables) to which the networking devices are connected.

An example is the "Power over Ethernet" (PoE) technology defined by standards IEEE 802.3af or IEEE 802.3at or IEEE 802.3bt of the Institute of Electrical and Electronics Engineers (IEEE).

A drawback of this technology is that existing PoE-compliant network interfaces are built to accommodate a power flow only in a single direction that cannot be reversed.

In other words, the network interface can only act either as an electrical load or as an electrical source, but cannot switch between these roles during operation.

Due to these limitations, existing PoE-compliant network interfaces are unsuitable for use in networking devices that may be used alternatingly as an electrical source and as an electrical load in the network (e.g., an energy storage device such as a battery).

At best, two PoE-compliant network interfaces may be installed in each device, one for outputting electrical power and the other one for receiving electrical power, but this solution is costly to implement and might create safety issues, as there would be a risk of improperly connecting the two interfaces to the network.

SUMMARY

The object of the present invention is therefore to provide improved network interfaces, devices and methods capable of providing a reversible electrical flow power over wired data telecommunications networks.

To that end, an aspect of the invention relates to a network interface apparatus allowing a bidirectional transmission of electrical power along with data over a wired telecommunications network, said network interface apparatus comprising:
  a connection portion adapted to connect the interface apparatus to a wired telecommunications network;
  a rectifier connected to the connection portion and comprising a plurality of rectifier elements, such as diodes;
  a power distribution bus connected to the rectifier.
The network interface apparatus also comprises a first power controller configured to control the supply of power to the power distribution bus when the network interface apparatus is powered by the network;
a second power controller configured to control the supply of power from the power distribution bus when the network interface apparatus is self-powered and aims to power a remote device through the network.

The apparatus further comprises:
  a first switch coupled to the first power controller and configured to selectively prevent electrical currents from flowing between the connection portion and the power distribution bus, and
  a second switch and a third switch each respectively coupled to the second power controller and configured to selectively prevent electrical currents from flowing from the power distribution bus to the connection portion.

The second switch is connected in parallel with a rectifier element of the rectifier, and the third switch is connected in parallel with a second rectifier element of the rectifier.

According to advantageous aspects, the invention comprises one or more of the following features, considered alone or according to all possible technical combinations:
  The rectifier is a diode bridge rectifier, wherein the rectifier elements are diodes, and wherein the cathode of the first diode is connected to a first output terminal of the rectifier and the anode of the first diode is connected to a first input terminal of the rectifier.
  The first switch is connected between the connection portion and the power distribution bus.
  The first power controller is configured to close the first switch only when the input voltage received at the connection portion exceeds a predefined threshold.
  The second power controller is configured to close the second switch and the third switch when the power distribution bus has excess power that can be delivered to a remote device through the network.
  The network interface apparatus further comprises an additional switch configured to selectively connect or disconnect the first power controller from the rectifier and wherein the network interface apparatus is configured to open the additional switch when the second power controller is attempting to determine electrical properties of a remote load connected to the network.
  The first, second and third switches are electrical switches, or transistor-based switches, such as Mosfets or Insulated Gate Bipolar transistors or bipolar transistors.
  The first power controller is configured to be automatically switched into a low power consumption mode when the second power controller is attempting to determine electrical properties of a remote load.

According to another aspect, a networking device comprises a plurality of network interface apparatuses as defined above, said networking device being configured to allow a transfer of electrical power between said network interfaces whenever required.

According to one or more embodiments, the networking device further comprises an additional interface suitable for transferring electrical power and is further configured to allow a transfer of electrical power either between the network interfaces, or between the additional interface and one of said network interfaces.

According to one or more embodiments, the networking device comprises three network interfaces.

According to another aspect, a wired telecommunications network, such as an Ethernet network, comprises a plurality of networking devices, wherein at least one networking device comprises a network interface apparatus as defined above.

According to one or more embodiments, the wired telecommunications network has a closed ring topology, such as a closed daisy chain topology.

BRIEF DESCRIPTION OF THE DRAWINGS

The invention will be further understood upon reading the following description, provided solely as a non-limiting example, and made in reference to the appended drawings, in which.

DETAILED DESCRIPTION OF SOME EMBODIMENTS

Figure 1:
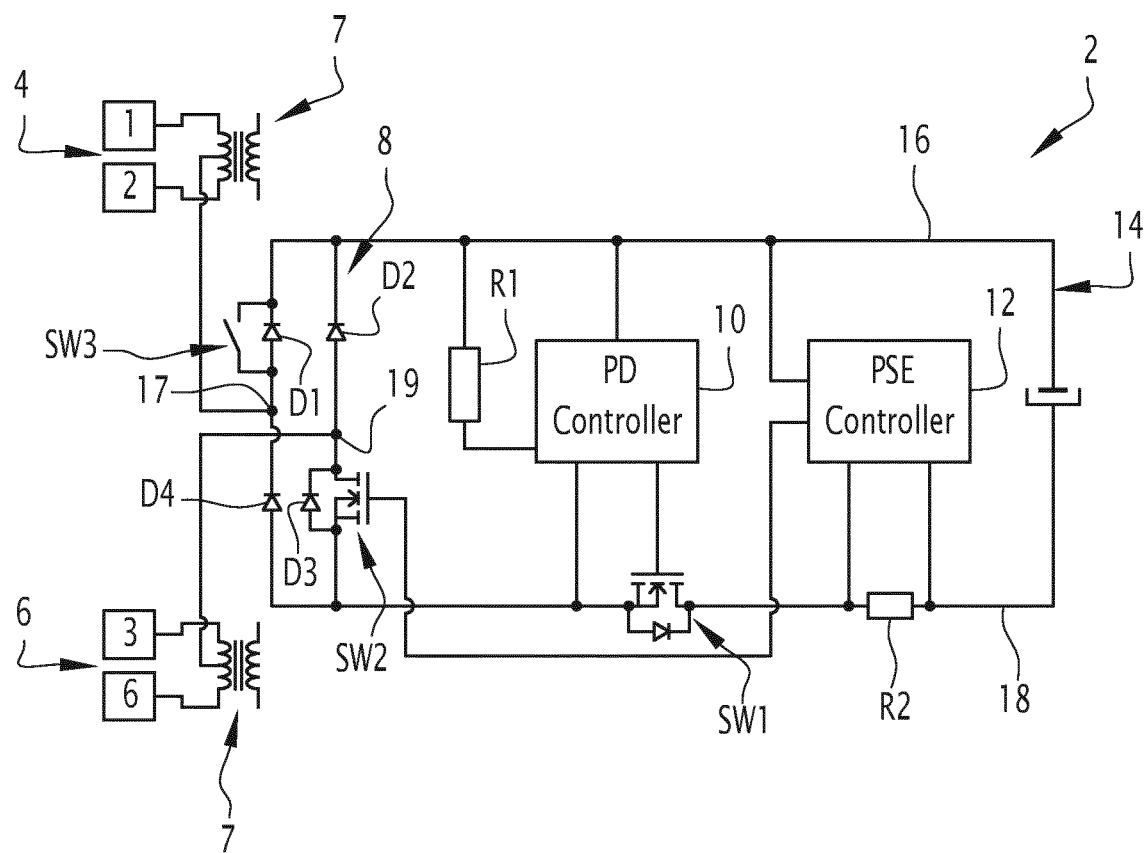
FIG. 1 is an electrical schematic diagram of a network interface apparatus in accordance with embodiments of the invention.

FIG. 1 is an electrical schematic diagram of a network interface apparatus 2 in accordance with embodiments of the invention.

The interface 2 is able to be connected to a wired data telecommunication network, such as an Ethernet-based network.

For example, the interface 2 may be connected to a data-carrying physical layer of said network (e.g., one or more cables, such as twisted pair Ethernet cables) through a dedicated connector.

In many embodiments, the interface 2 is meant to be associated (e.g., attached to or included in) a networking device, such as a computer, a mobile communication device, a wireless access point, a sensor, a camera, multimedia devices, industrial control devices, data routing and/or switching equipment, such as a network interface device, or the like.

These examples are not limiting and the interface 2 could be used in a wide range of networking devices.

The interface 2 is configured to allow a transmission of electrical power over the network data physical layer. For example, the interface 2 is compatible with the "Power over Ethernet" (PoE) technology, e.g. as defined by IEEE standards 802.3af, IEEE 802.3at or IEEE 802.3bt.

Preferably, the interface 2 allows a bidirectional transmission of electrical power to and from the network. For example, the interface 2 can be switched between a supply mode, in which it supplies electric power to the network, and a powered mode, in which the interface 2 receives electrical power from the network.

For example, in the supply mode, the electric power transferred by the interface 2 to the network (e.g., to power a remote networking device) comes from the network device of which the interface 2 is part. The network device is then acting as a power source equipment (PSE).

Similarly, in the powered mode, the electric power received by the interface 2 from the network may be used to power the network device of which the interface 2 is part. The network device is then acting as a powered device (PD).

In what follows, the interface 2 will be referred to as a "bidirectional" PoE network interface.

In the example of FIG. 1, it is to be understood that the interface 2 may be part of a networking device or a network interface device, although the details of such device may be omitted from the drawings and from the description. This device may be referred to as a "local device" in what follows.

As shown on FIG. 1, the interface apparatus comprises a connection portion and an electrical circuit.

The connection portion is able to connect the interface 2 to a wired telecommunications network.

In many embodiments, the connection portion comprises an electrical connector suitable to be connected to a wired telecommunications network. For example, said network may comprise a physical layer including a plurality of cables and wires, such as twisted-pair Ethernet cables, e.g. CAT 5e or CAT6e Ethernet cables.

In the illustrated embodiment, the connector comprises a first pair of pins 4 and a second pair of pins 6. The connection portion may also include other pins not shown in FIG. 1. Each pair of pins is adapted to be coupled to a pair of twisted cables.

As visible in the example of FIG. 1, the pins may follow the pin numbering scheme described in the ANSI/TIA-568 standard. The pins of the first pair of pins 4 may correspond to pins "1" and "2" while the pins of the second pair of pins 6 may correspond to pins "3" and "6". In an alternative, the pins of the first pair may correspond to pins "4" and "5" while the pins of the second pair of pins 6 may correspond to pins "7" and "8".

The interface apparatus further comprises coupling elements 7 for connecting the connection portion to the electrical circuit of the interface 2 and to a data processing portion of the device to which the interface 2 belongs.

The coupling elements 7 are configured to demodulate the incoming electrical signals received from the network in order to extract data signals and forward them to the data processing portion of the device, while forwarding the base signals to the electrical circuit. Similarly, the coupling elements 7 are configured to modulate outgoing signals and forward them towards the connection portion.

For example, the coupling elements 7 are magnetic coupling elements comprising a voltage transformer. In the illustrated embodiment, the interface apparatus comprises at least two such coupling elements 7. A first coil is connected to the pins of a pair of pins 4, 6 and to an input terminal of the electrical circuit. A second coil, magnetically coupled to the first coil, is connected to the data processing portion (not shown). In other embodiments, the coupling elements may include capacitors.

In what follows, the electrical interface circuit is simply referred to as "interface 2" for brevity and simplicity.

The interface 2 further comprises a rectifier 8, such as a diode rectifier bridge 8 comprising a plurality of diodes D1, D2, D3 and D4, such as semiconductor diodes, arranged in a conventional fashion.

For reason of simplicity the examples described will refer to diodes, which however may also be replaced by switches such as Mosfets as this allows to reduce losses in the diode rectifier 8. In that case, the switches may be connected in a bridge arrangement.

The description made below made in reference to diode-based rectifiers 8 can be transposed to alternative embodiments in which the diodes D1, D2, D3 and D4 are replaced by rectifier elements such as switches, especially semiconductor-based switches, such as Mosfets.

The rectifier 8 is connected to the connection portion through first 17 and second 19 input terminals. For example, the first input terminal 17 is connected to the first pair of pins 4 and the second input terminal 19 is connected to the second pair of pins 6.

The rectifier 8 comprises a first output terminal 16 and a second output terminal 18.

For example, the rectifier 8 comprises a first diode D1, a second diode D2, a third diode D3 and a fourth diode D4. The cathode of the first diode D1 is connected to the first output terminal 16 and the anode of the first diode D1 is connected to the first input terminal 17. Similarly, the second diode D2 is connected between the first output terminal 16 and the second input terminal 19 with its cathode connected to the first output terminal 16. The third diode D3 is connected between the second output terminal 18 and the second input terminal 19 with its cathode connected to the second input terminal 19. The fourth diode D4 is connected between the second output terminal 18 and the first input terminal 17 with its cathode connected to the first input terminal 17.

This configuration may be used in embodiments where diodes are replaced by switches such as Mosfets.

The interface 2 further comprises a first power controller 10 and a second power controller 12 connected between the rectifier 8 and an internal power distribution apparatus 14, such as a power distribution bus 14, such as a DC (Direct Current) power distribution bus 14.

For example, the first output terminal 16 is connected to a first point of the power distribution bus 14 and the second output terminal 18 is connected to a second point of the power distribution bus 14. Said second point may be connected to an electrical ground point.

The electrical circuit is configured to selectively connect the connection portion to a power supply unit, or an internal power distribution bus, or any device configured to deliver electrical power to internal elements of the device, said device being connected to the internal power distribution bus 14.

The first power controller 10 and the second power controller 12 will be referred to as "PD controller 10" and "PSE controller 12" in what follows.

In many embodiments, the PD controller 10 and the PSE controller 12 are electronic controllers implemented by electronic circuitry and/or by processor-based control devices.

The PD controller 10 and the PSE controller 12 are not necessarily separate devices and may in some cases be implemented by the same electronic circuit.

The PD controller 10 is configured to control the supply of power from the network to the power distribution bus 14 when the device is powered by the network.

The PSE controller 12 is configured to control the supply of power from the power distribution bus 14 to the network when the device is self-powered and aims to power a remote device through the network.

PD controllers 10 and PSE controllers 12 are well known in the art and their specifications are described in the aforementioned IEEE standards, and for this reason they are not described in further details herein.

In the illustrated example, the PD controller 10 and the PSE controller 12 are connected between first and second output terminals 16 and 18 of the rectifier 8.

In addition, the interface 2 comprises an input voltage detection apparatus able to detect a voltage on the connection portion when the device is not powered. This allows to detect the presence of a PSE in the network.

In this example, the input voltage detection apparatus comprises a first resistor R1 connected in parallel with the rectifier 8, e.g. between points 16 and the PD controller. Corresponding input terminals of the PD controller 10 are connected in parallel with the first resistor R1, e.g. between terminals 16 and 18.

In some embodiments, the first resistor R1 may be part of or integrated with the PD controller 10, in accordance with IEEE standards.

In the illustrated example, the PD controller 10 is connected to the output of the rectifier bridge 8 and the PSE controller 12 is connected to the power distribution bus 14.

The interface 2 further comprises a first switch SW1, also named control switch, coupled to the PD controller 10.

The switch SW1 can be switched by the PD controller 10 between an open state and a closed state. In the open state, the switch SW1 prevents electrical currents from flowing between the connection portion and the power distribution bus 14.

In the illustrated example, the first switch SW1 is connected to the point 18 between the bus 14 and the rectifier 8.

According to several embodiments, the switch SW1 may be an electromechanical switch, or a relay, or an electrical switch, or a transistor-based switch, such as a Mosfet or an Insulated Gate Bipolar transistor, or a bipolar transistor, any semiconductor-based switch.

The interface 2 further comprises a second resistor R2, also named current sensing resistor, coupled to the PSE controller 12. For example, the second resistor R2 is connected in series between the terminal 18 and the power distribution bus 14 and is connected to input pins of the PSE controller 12.

The interface 2 further comprises a second switch SW2 coupled to the PSE controller 12 and connected in parallel with a diode of the rectifier 8.

In general, the second switch SW2 is connected in parallel with a rectifier element 8 (such as a diode in the present example) between the second output terminal 18 and either the first input terminal 17 or the second input terminal 19 (as in the illustrated example).

For example, the second switch SW2 is connected in parallel with a third diode D3 of the rectifier bridge 8. The third diode D3 is connected between a second input terminal of the rectifier (the input connected to the second pair of pins 6) and the second output terminal 18, with its cathode connected to said second input terminal.

The switch SW2 can be switched, by the PSE controller 12, between an open state and a closed state.

In the open state, the power distribution bus 14 is prevented from supplying power to the network, although power can flow in the reverse direction, i.e. from the network to the power distribution bus 14.

The switch SW2 may be an electrical switch, or a transistor-based switch, such as a Mosfet or an Insulated Gate Bipolar transistor, or a bipolar transistor, or any semiconductor-based switch. Mosfet or other semiconductor technology is preferred, in line with IEEE standards, as this allows the switch in case of short circuit to operate in linear mode and limit the output. Preferably, the switch SW2 is a protection switch.

The interface 2 further comprises a third switch SW3 coupled to the PSE controller 12 and connected in parallel with a diode of the rectifier 8.

In general, the third switch SW3 is connected in parallel with a rectifier element 8 (such as a diode in the present example) between the first output terminal 16 and (depending on where the second switch SW2 is connected) the first input terminal 17 or the second input terminal 19 (i.e., the third switch SW3 is not connected to the same input terminal as the second switch SW2).

For example, the third switch SW3 is connected in parallel with a first diode D1 of the rectifier bridge 8. The first diode D1 is connected between the first input terminal of the rectifier 8 (the input connected to the first pair of pins 4) and the first output terminal 16, with its cathode connected to said first output terminal.

In other words, the cathode of the first diode D1 is connected to the first output terminal 16 of the rectifier 8 and the anode of the first diode D1 is connected to a first input terminal of the rectifier 8.

The switch SW3 can be switched by the PSE controller 12 between an open state and a closed state. In the open state, the power distribution bus 14 is prevented from supplying power to the network, although power can flow in the reverse direction, i.e. from the network to the power distribution bus 14.

The switch SW3 may be an electromechanical switch, or a relays, or an electrical switch, or a transistor-based switch, such as a Mosfet or an Insulated Gate Bipolar transistor or equivalent technologies, or a bipolar transistor, or any semiconductor-based switch.

The PSE controller 12 may be configured to close the switch SW3 and/or the switch SW2 when the power distribution bus 14 has excess power that can be delivered to a remote device through the network.

As an alternative to the arrangement of FIG. 1, switch SW3 may be connected in parallel with the second diode D2 while switch SW2 may be connected in parallel with the fourth diode D4. The operation of the bidirectional interface as explained below, will remain the same.

Figure 2:
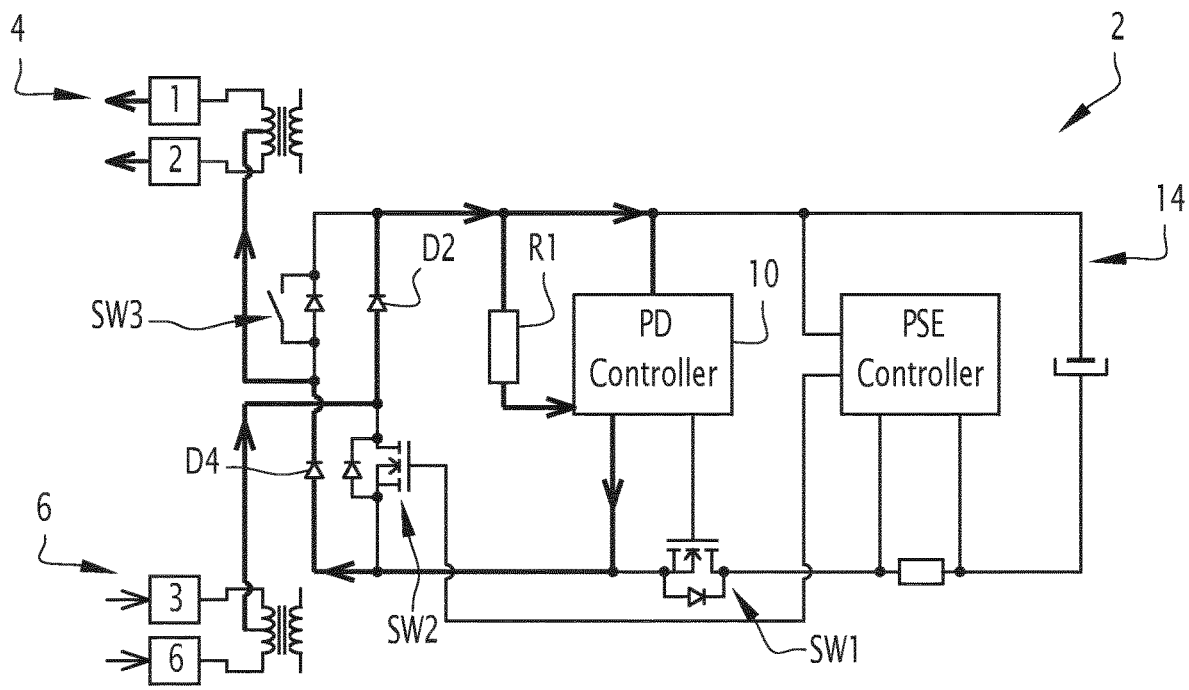
FIG. 2 and FIG. 3 are electrical schematic diagrams illustrating, along with the flow chart of FIG. 4, a first mode of operation of the network interface apparatus of FIG. 1.
Figure 3:
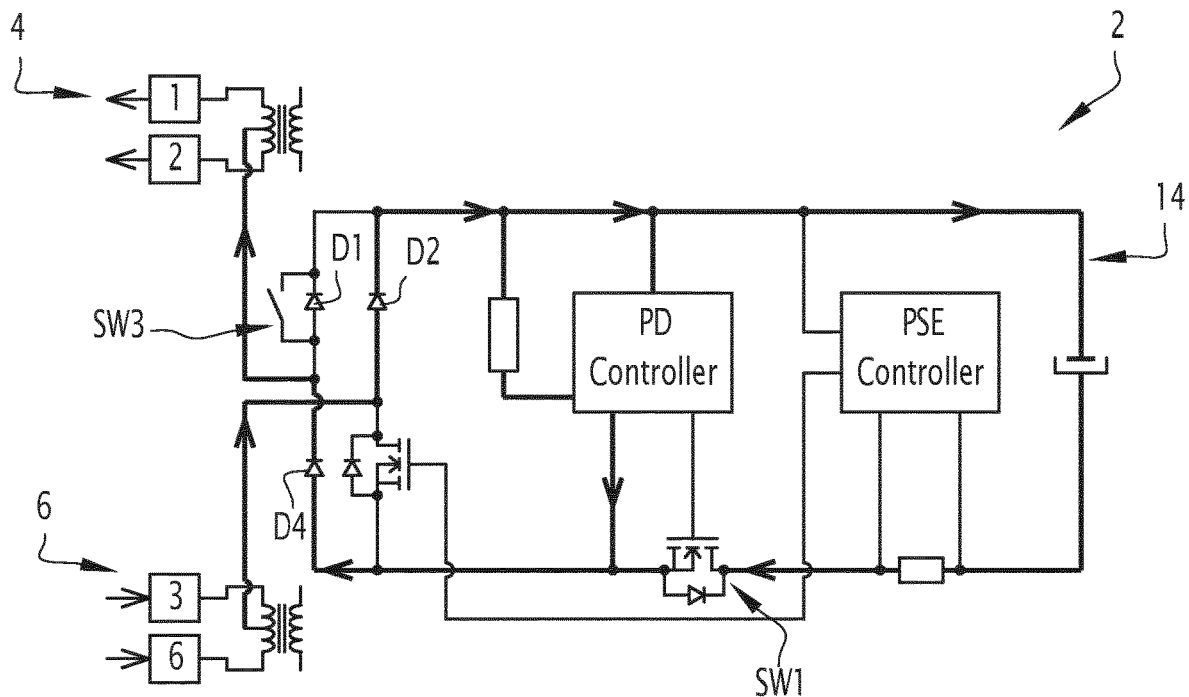
Figure 4:
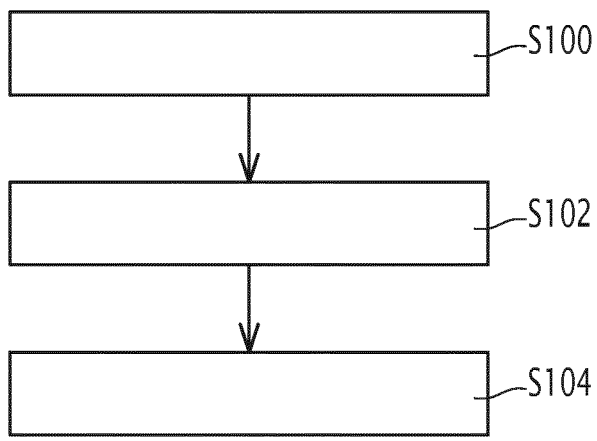

FIGS. 2, 3 and 4 illustrate an example of a first operation mode of the bidirectional interface 2.

For example, in this first operation mode, the device associated to the interface 2 is not electrically powered by itself and has to be powered by the network through the interface 2.

Initially, there is no voltage on the power distribution bus 14.

At step S100, an electrical voltage is applied to the interface 2, e.g., between the connectors 4, 6.

For example, a remote networking device (e.g., a Power Sourcing Equipment), connected to the interface 2 through a PoE-compliant network, supplies electrical power to the interface 2.

As shown by the arrows on FIG. 2, an electrical current flows through the input voltage detection apparatus (i.e., through the first resistor R1 and through the sensing input lead of the PD controller 10).

The PD controller 10 measures the input voltage and compares it to a predefined threshold. At this stage, however, the switch SW1 is in an open state and prevents electrical currents from flowing to the power distribution bus 14.

At step S102, once the input voltage exceeds a predefined threshold, the PD controller 10 closes the switch SW1.

In other words, the PD controller 10 is configured to close the first switch SW1 only when the input voltage received at the connection portion exceeds a predefined threshold.

At step S104, as shown by the arrows on FIG. 3, electrical currents can now flow throughout the interface circuit and can reach the power distribution bus 14. The power distribution bus 14 is then energized. The local device associated to the interface 2 is now electrically powered through the network by a remote PSE and behaves as a powered device (PD).

Figure 5:
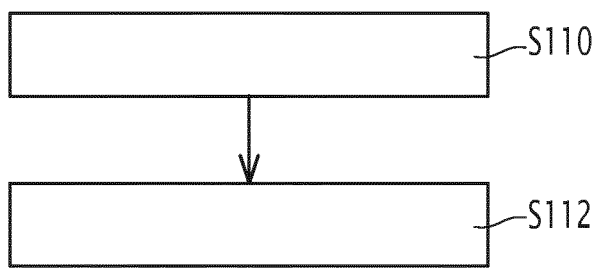
Figure 6:
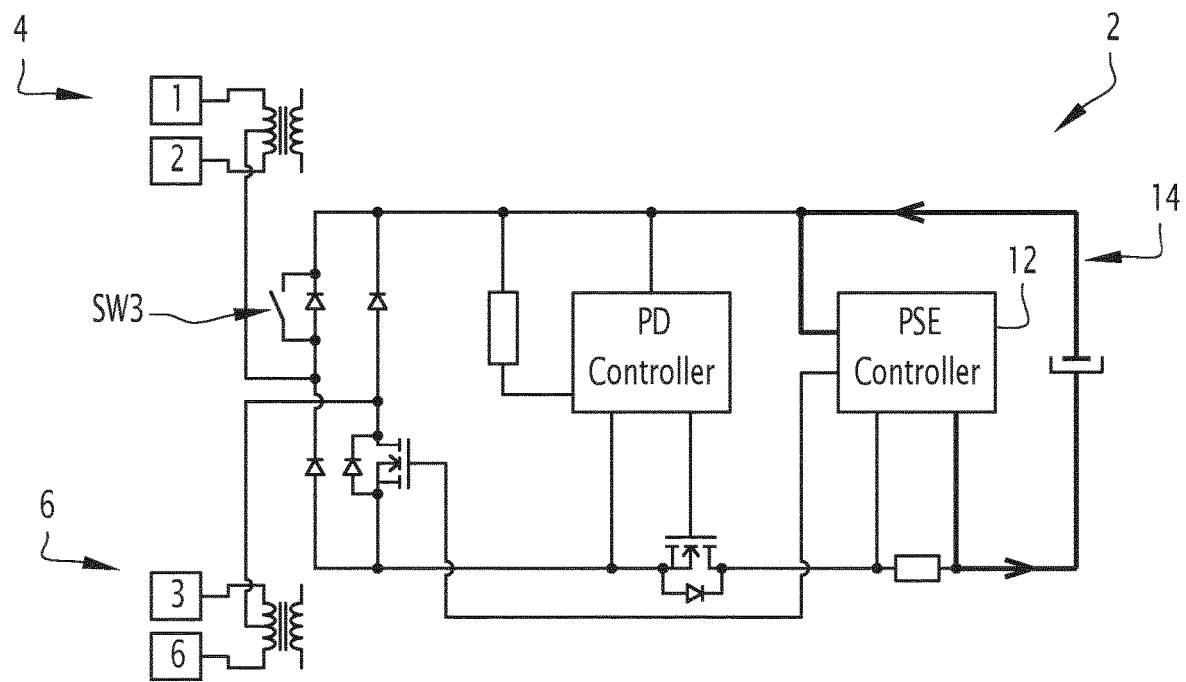
FIG. 6 and FIG. 7 are electrical schematic diagrams illustrating, along with the flow chart of FIG. 5, a second mode of operation of the network interface apparatus of FIG. 1.
Figure 7:
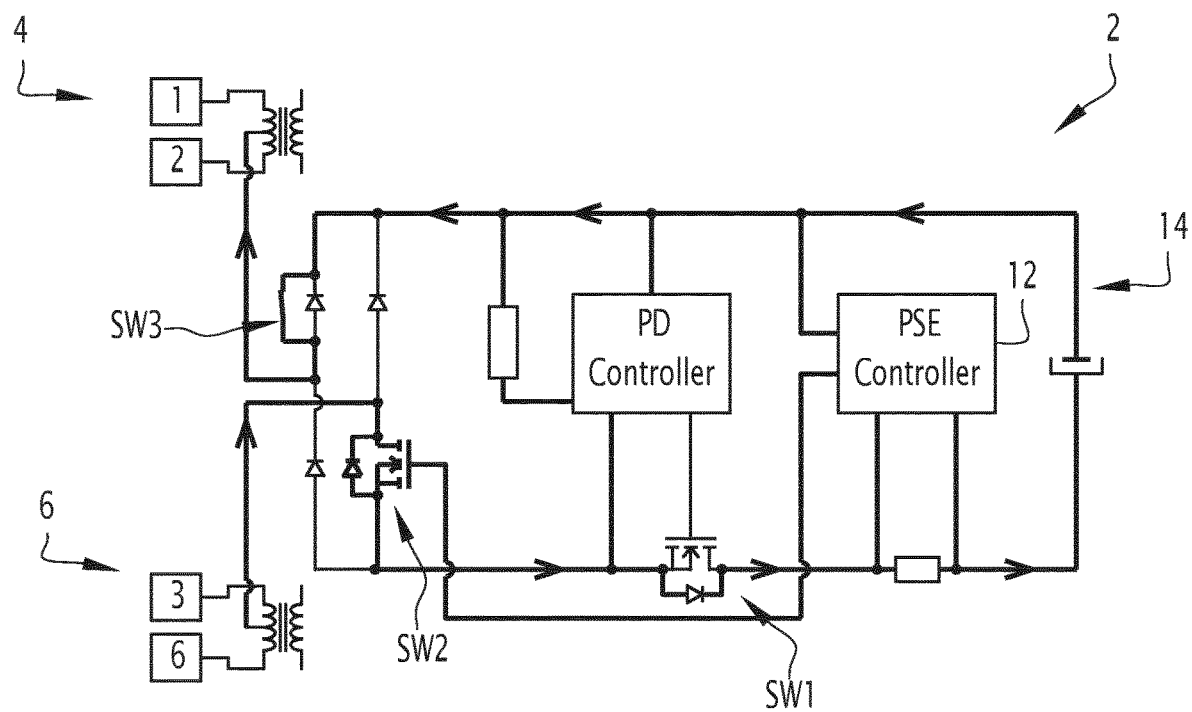

FIGS. 5, 6 and 7 illustrate an example of a second operation mode of the bidirectional interface 2.

For example, in this second operation mode, the local device associated to the interface 2 is electrically powered and may include or be connected to a local power source.

The local device may attempt to supply power to a remote load connected to the network through the interface 2.

Initially, as shown on FIG. 6, the power distribution bus 14 is powered by a local power source. The PSE controller 12 is also powered by the local power source.

However, at this stage, the switches SW2 and SW3 are open. Electrical currents are prevented from flowing from the power distribution bus 14 to the connectors 4, 6.

At step S110, the PSE controller 12 closes the switches SW2 and SW3.

Electrical currents can now flow from the power distribution bus 14 to the connectors 4, 6, as shown by the arrows on FIG. 7.

At step S112, the PSE controller 12 initiates a method to provide electrical power to the network.

For example, this method may include steps to determine electrical properties of the one or more remote devices to be powered, to ensure that the remote device can receive electrical power and to assess how much electrical power should be delivered to the network.

This method may be performed in accordance with the PoE signature detection processes and source processes described in the IEEE standard 802.3af, 802.3at or 802.3bt.

By default, the bi-directional interface is in load mode, meaning the first PD controller 10 is ON and second PSE controller 12 is OFF. When it is determined that the interface apparatus may operate as a source, the first controller 10 is switched OFF, or at least in low power/no consumption mode, and the third switch SW3 in closed. Then the second controller 12 is switched ON and power is provided via the network interface apparatus by controlling the second switch SW2 and monitoring output voltage and current as described in IEEE standard.

In order to return to load mode, the opposite procedure is performed: switching the second controller 12 OFF, switching the third SW3 open and switching the first controller ON.

The method steps described above, especially in reference to FIGS. 4 and 5, may be implemented by the PD and PSE controllers 10, 12 and/or by a control device of the interface apparatus 2.

The control device may comprise electronic circuitry, such as a processor (e.g., a microcontroller) and a computer readable storage medium such as a computer memory (e.g., read-only memories, electrically erasable and programmable read only memories, flash memory, or any other type of media suitable for storing electronic instructions).

The computer readable storage medium may store executable machine code and/or software code causing the processor to implement one or more of the above method steps when executed by the processor.

In other embodiments, the control device may be implemented differently and may include application specific integrated circuits (ASIC), or programmable circuits such as field programmable gate arrays (FPGA), or equivalents thereof, and more generally any circuit or processor capable of executing the functions described herein.

In some optional embodiments, the PD controller 10 may be automatically switched into a low power consumption mode when the PSE controller 12 is attempting to determine electrical properties of the remote load (e.g., during the detection and classification steps described in reference to FIG. 5). By doing so, the electrical current consumption of the PD controller 10 is temporarily reduced and the detection and classification process thus yields a more accurate result.

Figure 8:
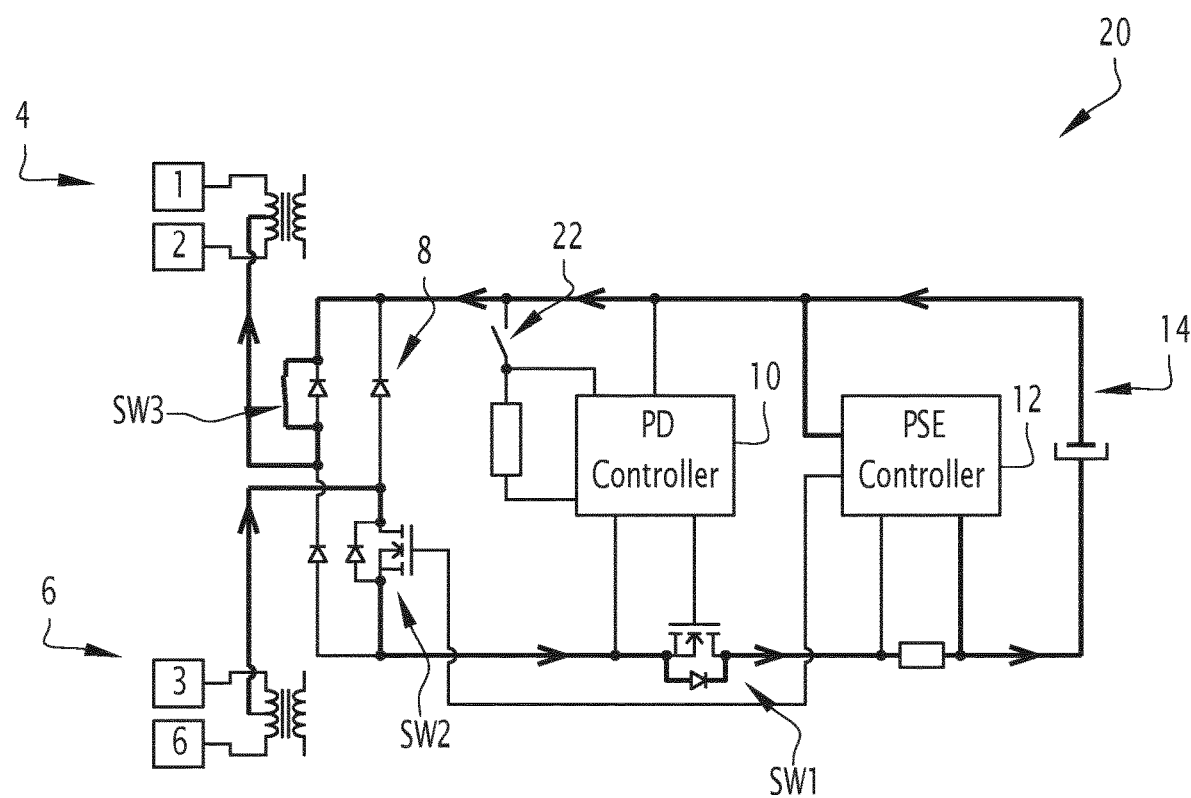
FIG. 8 is an electrical schematic diagram of a network interface apparatus in accordance with another embodiment.

Another embodiment of the bidirectional interface 2 is now described in reference to FIG. 8, which illustrates a bidirectional PoE interface 20 similar to the interface 2 described above and configured to perform a similar function.

The interface 20 differs from the interface 2 in that an additional disconnect switch 22 is connected in series between the point 14 and the input voltage detection apparatus.

For example, a first electrode of the switch 22 is connected to the high point 14 and the opposite electrode of the switch 22 is connected to the first resistor R1 and to the sensing input of the PD controller 10.

Again, the first resistor R1 may be part of or integrated with the PD controller 10, as according to IEEE standards. Similarly, the switch 22 may be part of the PD controller 10, e.g. in the form of a reset pin present on the PD controller.

The other elements of the interface 20 are the same as in the embodiments of the interface 2. These elements bear the same reference signs and are not described in detail, given that their previous description can be transposed to this embodiment.

The interface 20 is configured to open the switch 22 (and thus disconnect the PD controller and the resistor R1 from the rectifier bridge 8) when the interface 20 is in the supply mode, and more particularly when the PSE controller 12 is attempting to determine electrical properties of the remote load (e.g., during the detection and classification steps described in reference to FIG. 5).

By doing so, the electrical current consumption of the PD controller 10 can be temporarily eliminated. The detection and classification process thus yields a more accurate result.

According to several embodiments, the switch 22 may be an electromechanical switch, or a relay, or an electrical switch, or a transistor-based switch, such as a JFET or a Mosfet of an Insulated Gate Bipolar transistor, or a bipolar transistor, or any semiconductor-based switch.

Preferably, the switch 22 is by default in the closed state and is opened only in the supply mode, preferably only during the detection and classification process.

For example, the switch 22 may be driven by a control device of the interface 20, such as a processor or a microcontroller.

Figure 9:
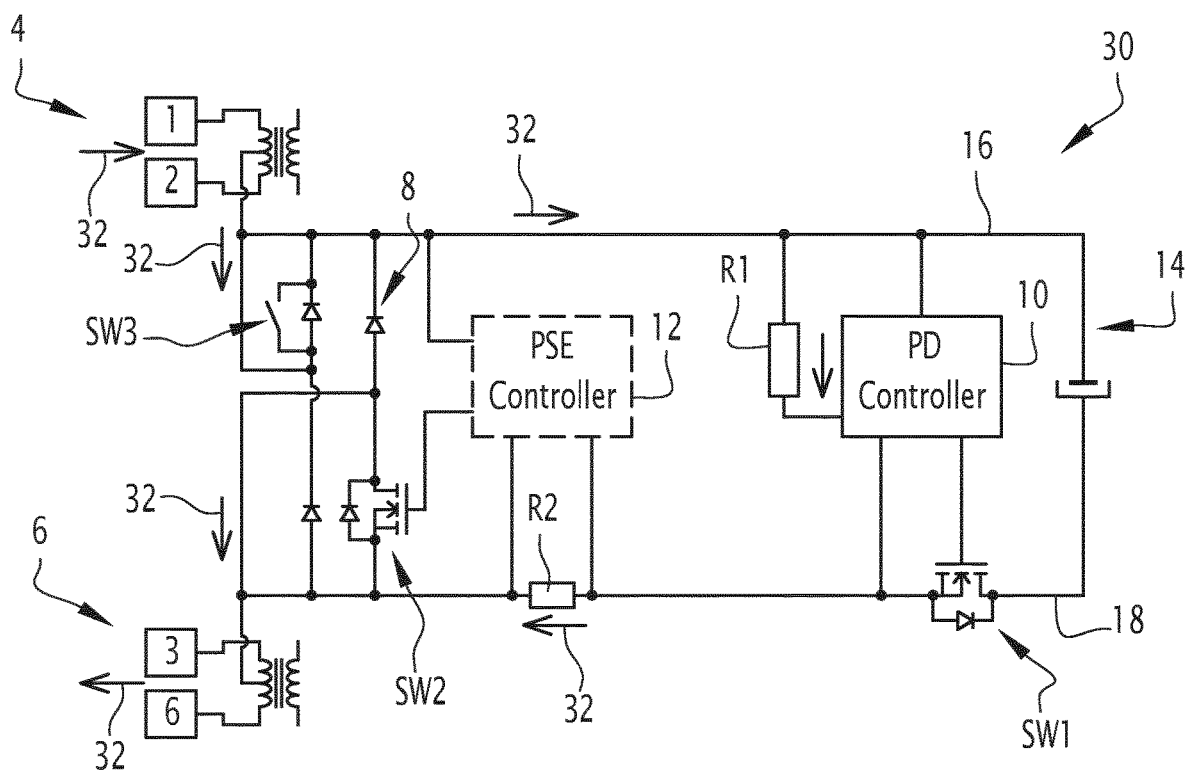
FIG. 9 is an electrical schematic diagram of a network interface apparatus in accordance with another embodiment.

Another embodiment of the bidirectional interface 2 is now described in reference to FIG. 9, which illustrates a bidirectional PoE interface 30 similar to the interface 2 described above and configured to perform a similar function.

The interface 30 differs from the interface 2 in that the positions of the PD controller 10 and the PSE controller 12 have been swapped.

For example, the PSE controller 12 is connected to the output of the rectifier bridge 8 and the PD controller 10 is connected to the power distribution bus 14. The first resistor R1 remains connected to a measurement input of the PD controller 10 but is no longer directly connected to the rectifier bridge 8. Again, the first resistor R1 may be part of or integrated with the PD controller 10, as according to IEEE standards.

The other elements of the interface 30 are the same as in the embodiments of the interface 2. These elements bear the same reference signs and are not described in detail, given that their previous description can be transposed to this embodiment.

This configuration is advantageous when the interface 30 is in the supply mode, and more particularly when the PSE controller 12 is attempting to determine electrical properties of the remote load (e.g., during the detection and classification steps described in reference to FIG. 5).

With this configuration, the supply current of the PD controller 10 does not flow through the shunt resistor R2 associated with the PSE controller 12.

As shown in FIG. 9 by arrows 32 illustrating the current flow, only the electrical currents coming from the connectors 4, 6 (from the network) are measured by the PSE controller 12. As a result, the detection and classification process may be more precise and accurate.

Figure 10:
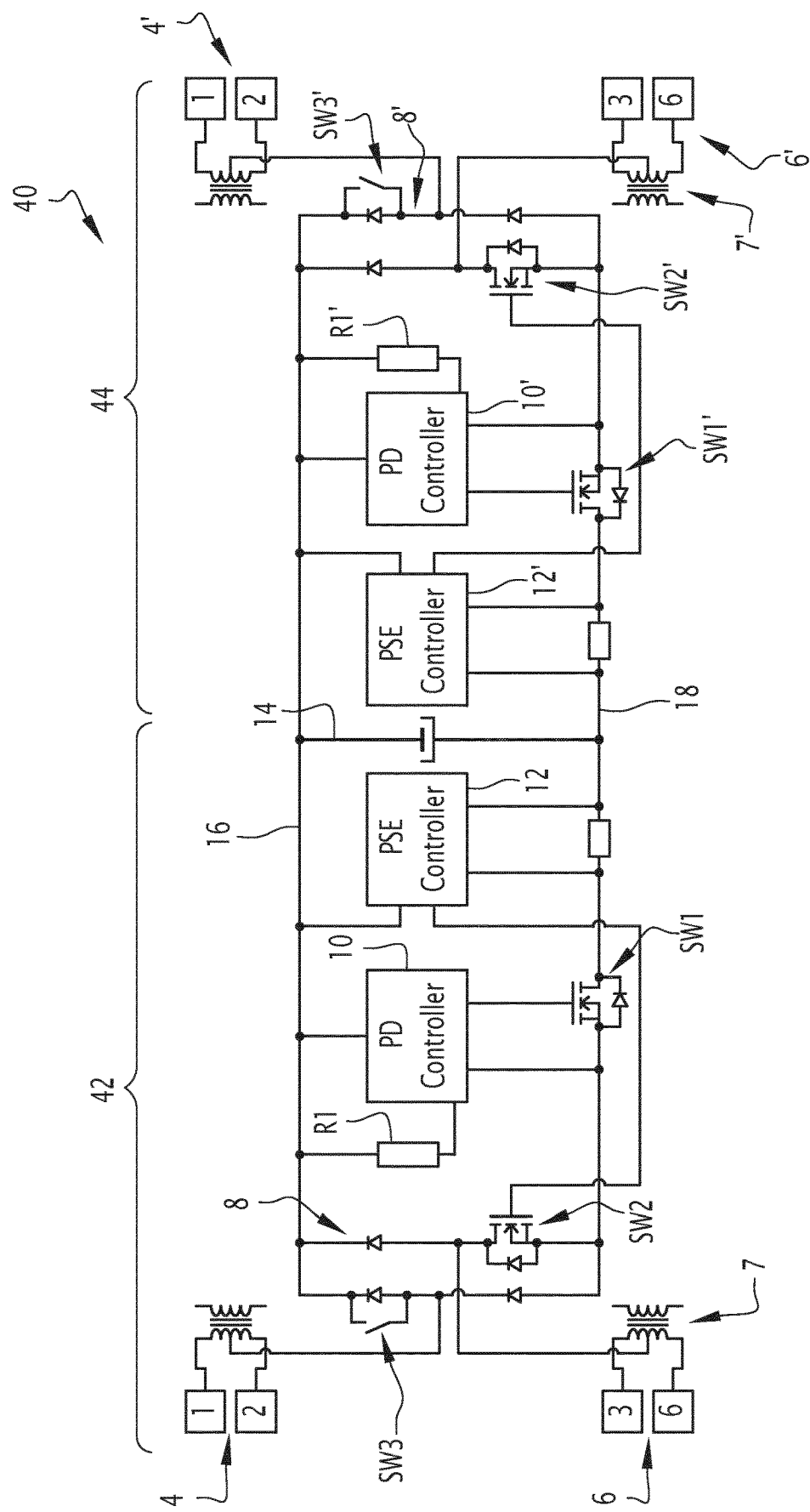
FIG. 10 is an electrical schematic diagram of a network interface apparatus in accordance with yet another embodiment.

Another embodiment is now described in reference to FIG. 10, which illustrates a bidirectional PoE interface apparatus 40.

The interface apparatus 40 comprises a first interface 42 and a second interface 44.

Each of the first and second interfaces 42 and 44 are similar or identical to the interface apparatus 2 and is configured to perform a similar function.

The elements of the first and second interfaces 42 and 44 are the same as in the embodiments of the interface 2. These elements are not described in detail, given that their previous description can be transposed to this embodiment.

The elements of the first interface 42 bear the same reference signs as in the interface 2. The elements of the second interface 44, however, bear the same reference signs appended with the prime "'" symbol (e.g., the PD controller of the second interface 44 is similar to PD controller 10 and is identified by reference 10').

In this embodiment, the first and second interfaces 42 and 44 are connected together and share the same power distribution bus 14 and also share the same electrical ground.

In many embodiments, the first and second interfaces 42 and 44 may operate independently from each other (e.g. one of the two interfaces may be in the supply mode while the other interface is in the powered mode, or both may be in a same mode).

In a similar fashion, a network interface apparatus may comprise multiple interfaces, such as three, four or more, with their respective first and second output terminals respectively connected.

Figure 11:
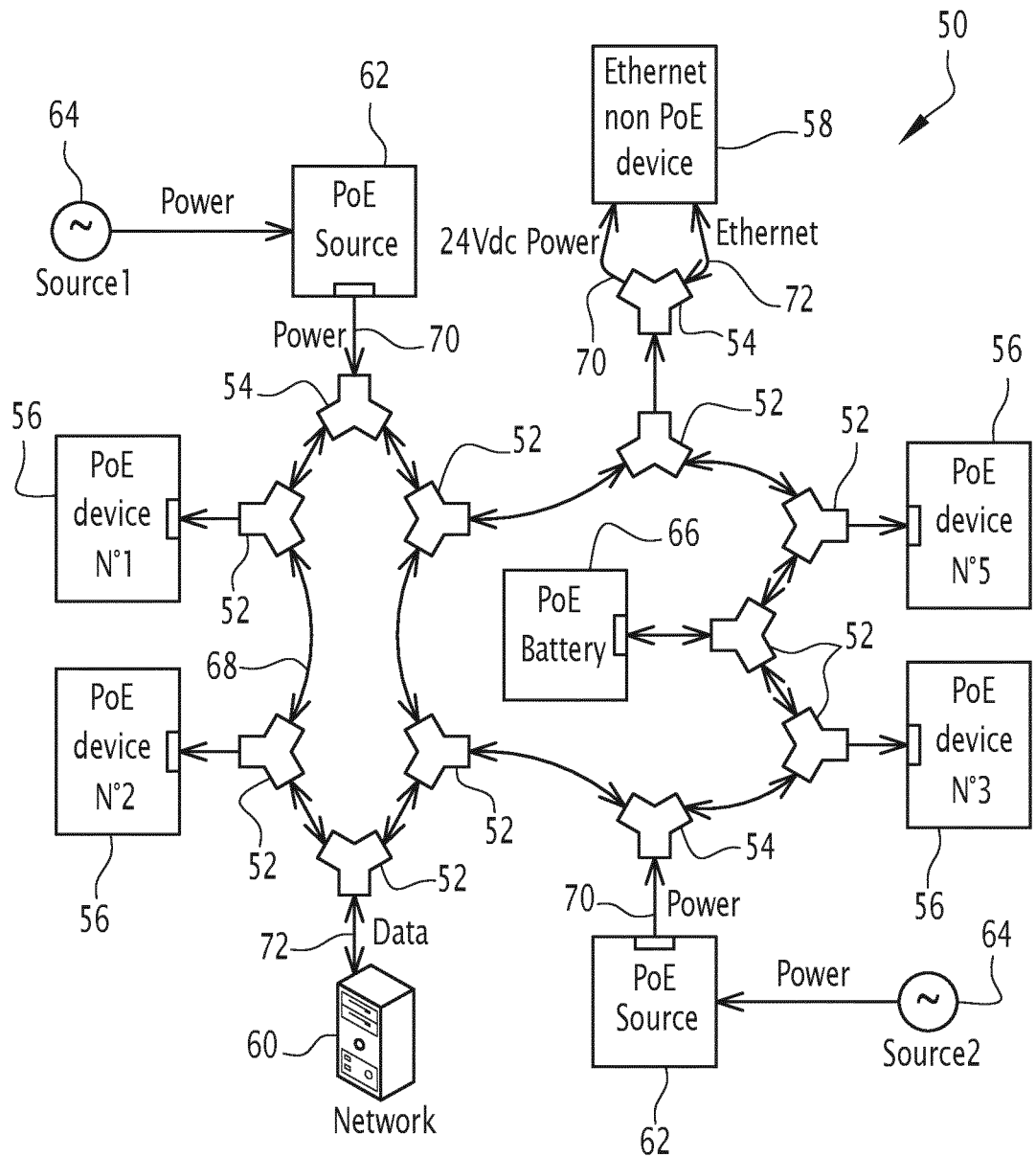
FIG. 11 is a block diagram of an exemplary wired telecommunications network comprising a plurality of network devices comprising one or more network interfaces in accordance with embodiments.

Turning now to FIG. 11, there is illustrated an exemplary wired telecommunications network 50 comprising a plurality of networking devices.

For example, the network 50 is an Ethernet network, preferably a PoE-compliant Ethernet network.

The network 50 comprises a plurality of network interface devices 52 and 54 connected to each other by means of wired links, such as cables.

Each network interface device 52 and 54 comprises at least one PoE-compliant bidirectional network interface 2, 20, 30 or 40 according to embodiments described above, and preferably comprises two or more of such bidirectional network interfaces 2.

In the illustrated example, the network 50 may comprise several different types of networking devices, such as one or more of the following:

PoE-compliant networking devices comprising a PoE-compliant bidirectional network interface 2 (reference 56), non-PoE networking devices that may nonetheless be electrically powered over the network 50 (reference 58), Ethernet-only networking devices 60, power sourcing equipment 62 powered by an external power source 64, and PoE-compliant reversible power sourcing equipment 66, such as one or more batteries.

For example, the networking devices 60 may be routing equipment and may connect the network 50 to another telecommunications network, such as a Local Area Network (LAN) or the World Wide Web. For example, said networking devices 60 may comprise a classical Ethernet interface suitable only for transferring data and not for transferring electrical power to power a remote networking device.

The power sourcing equipment 62 may be configured solely to supply power coming from the external power source 64, i.e. to allow only a power flow directed towards the network 50.

The external power source 64 may be an AC (Alternating Current) power source 64, such as a power grid or a power generator.

The reversible power sourcing equipment 66 is capable of acting either as an electrical load or an electrical charge during operation of the network 50.

For example, the power sourcing equipment 66 may comprise a rechargeable battery and a bidirectional PoE interface 2, 20, 30, thus allowing a reversible power flow between the battery and the network 50.

Each of said networking devices may be connected to a network interface device 52 or 54.

In many embodiments, network interface devices 52 and 54 can be used as building blocks to build a network 50 with a specific topology, such as a ring topology or a closed loop topology, preferably a closed daisy chain loop.

For example, the network interface devices 52 and 54 are connected to each other by wired links 68 suitable for transferring data along with electrical power.

In some cases, some networking devices, such as devices 58, 60 and 62, may be connected to a network interface device 52 or 54 through a power-only connection link 70 (i.e., a wired connection suitable to transfer electrical power but not data) and/or through a data-only connection link 72 (i.e., a wired connection suitable to transfer data but not electrical power).

Figure 12:
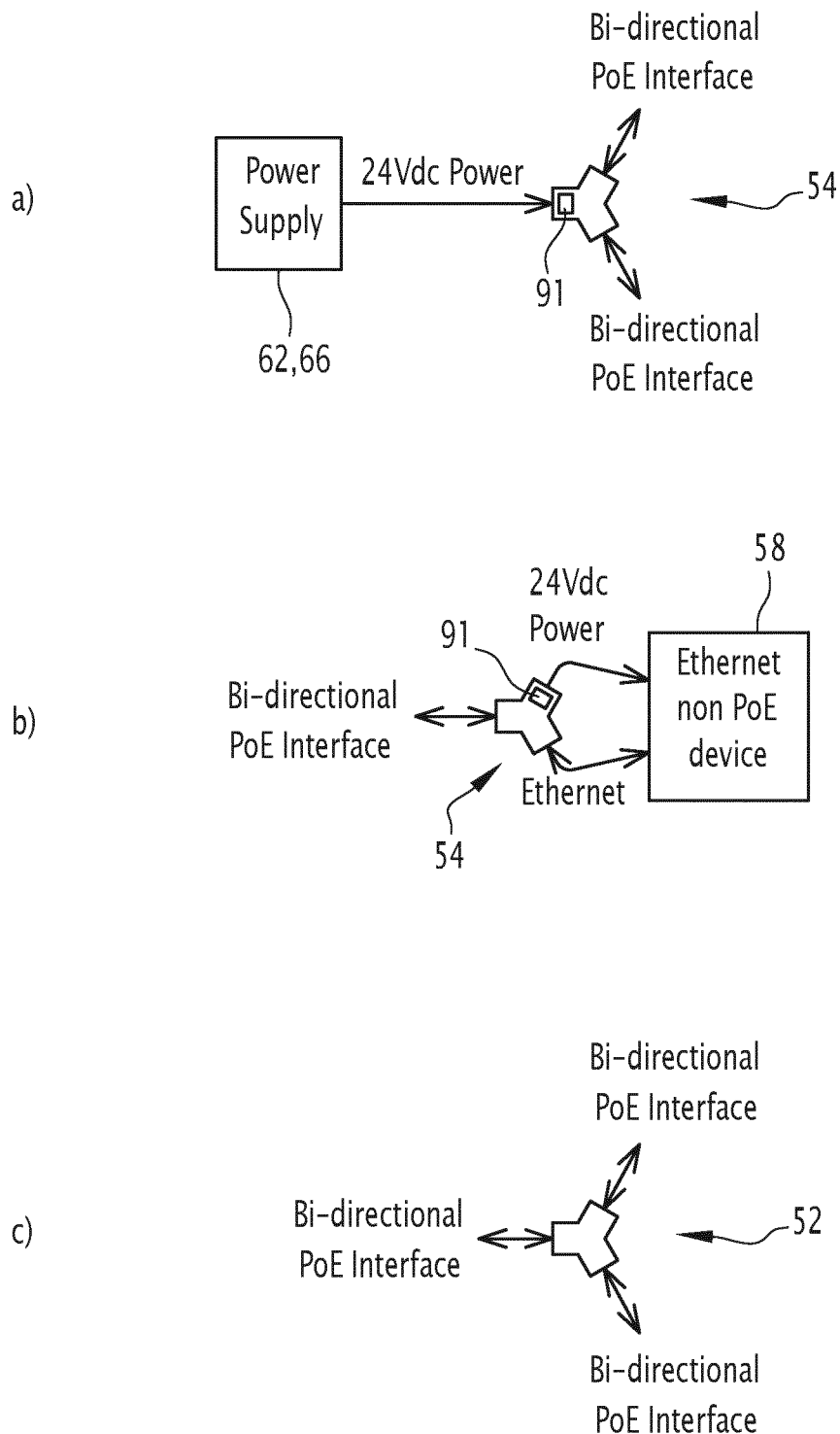
FIG. 12 is a simplified representation of several networking devices each comprising one or more network interfaces in accordance with embodiments.

In preferred embodiments, as illustrated on inset (c) of FIG. 12, a first type of network interface device 52 comprises three bidirectional network interfaces 2.

Each network interface device 52 is configured to act as a network switch for routing or relaying data messages between said network interfaces. Each network interface device 52 is further configured to allow a transfer of electrical power between said network interfaces whenever required.

Figure 14:
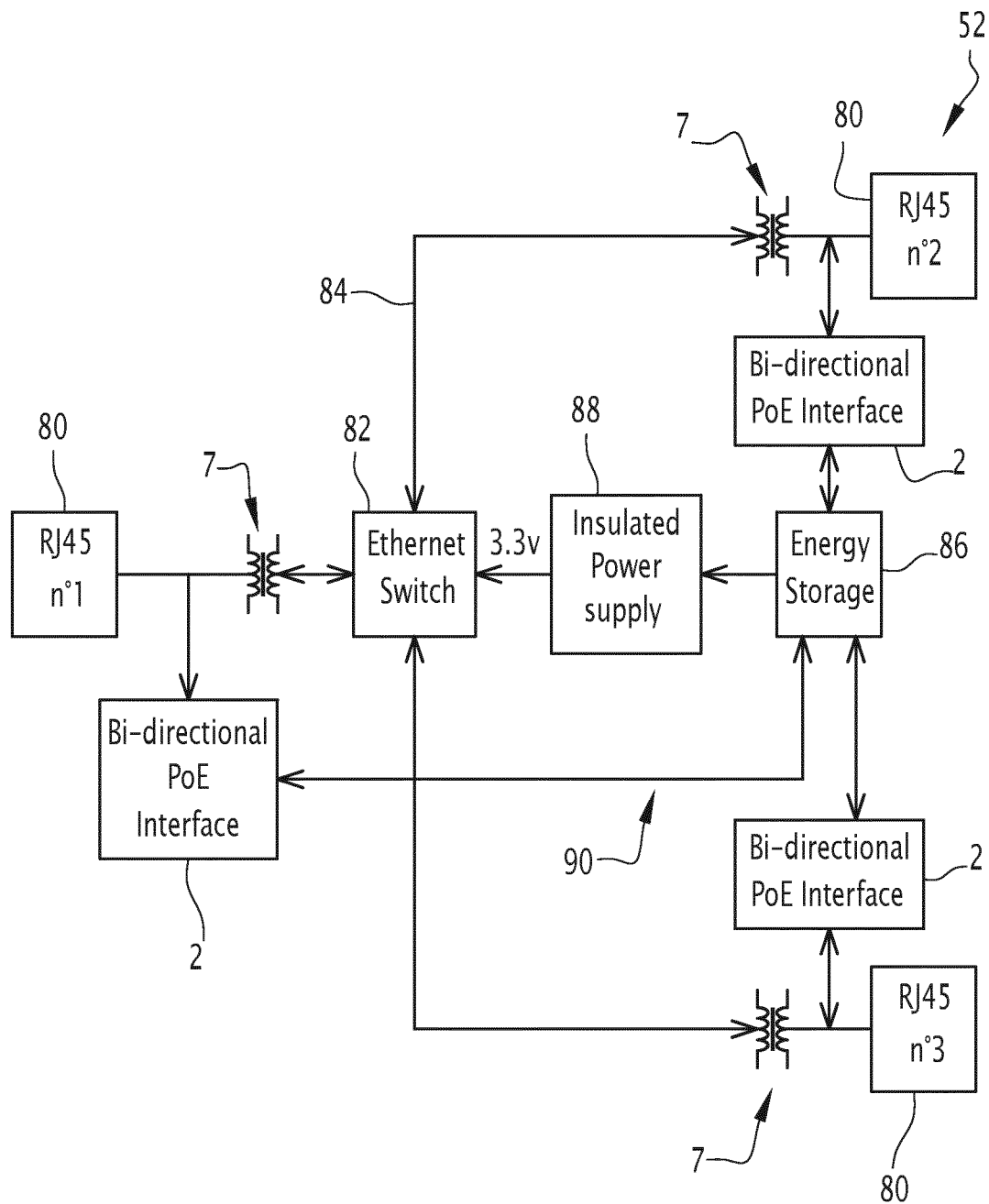
FIG. 14 is a block diagram of another embodiment of a networking device comprising a plurality of network interfaces in accordance with embodiments

FIG. 14 is a block diagram of an exemplary network interface device 52.

According to many embodiments, the first-type network interface device 52 comprises three bidirectional PoE interfaces in accordance with the embodiments as described above, e.g., in reference to FIG. 1.

For example, the device 52 comprises three electrical connectors 80 suitable to be connected to a wired data link, such as an Ethernet cable.

For example, the connectors 80 are modular connectors, such as 8P8C connectors, or RJ-45 connectors.

Each connector 80 is associated to a coupling device 7 as described previously for separating data signals from the received electrical signals.

The device 52 comprises an Ethernet switch controller 82 connected to the data processing portion of the coupling devices 7 through internal data links or buses 84. The Ethernet controller 82 is configured to route or relay data messages between the connectors 80.

Each connector 80 is also associated to a bidirectional PoE network interface circuit 2 for transferring electrical power to an internal power bus 90.

In the illustrated example, each interface 2 circuit is connected to an internal energy storage device 86 adapted to temporarily store electrical power and act as a buffer when power is transferred between interface circuits 2 during operation.

The storage device 86 may include one or more capacitors, or super-capacitors, or electrochemical batteries.

The device 52 may also include an insulated power supply 88 powered by the energy storage device 86 and configured to provide electrical power to the Ethernet switch controller 82.

For example, the insulated power supply 88 is configured to deliver a stabilized 3.3 V DC voltage to power the Ethernet switch controller 82.

According to a non-limiting example, the insulated power supply 88 may be insulated against voltages up to 2.5 kV.

In many embodiments, the device 52 may include a case enclosing the various components of the device 52, such as a metal case or a molded plastic case. The case may be mounted onto a rack, for example in an electrical panel or inside a server cabinet.

In other embodiments, the number of connectors 80 and bidirectional interfaces could be different than in the present example, e.g., equal to two or greater than three. In that case, the device 52 is modified in consequence and in accordance with the principles described above.

Referring back to FIG. 12, as illustrated on insets (a) and (b), a second type of network interface device 54 comprises two bidirectional network interfaces 2 and an additional interface 91, or power interface, suitable for transferring electrical power.

Each network interface device 54 is configured to act as a network switch for routing or relaying data messages between said interfaces.

Each network interface device 54 is further configured to allow a transfer of electrical power either between the bidirectional network interfaces or between the additional interface and one of the bidirectional interfaces.

For example, the additional interface may be adapted to carry DC electrical power, such as 24 Volts DC power.

The additional interface may comprise a suitable power connector (such as a two-pin connector) and appropriate electrical protection devices, e.g. to protect the device 54 against short circuits and overload currents.

In practice, however, the additional interface is unsuitable to carry data and cannot be directly connected to the network 50 or to an Ethernet port of a networking device.

In some embodiments, as shown on inset (a) of FIG. 12, the additional interface 91 may be used to receive electrical power from a power supply device 62 or 66. The received electrical power may then be forwarded by the network interface device 54 towards the network 50 through one of the bidirectional interfaces, for example to power a remote networking device connected to the network 50.

In some other embodiments, as shown on inset (b) of FIG. 12, the additional interface 91 may be used to power a non-PoE device 58. For example, said non-PoE device 58 may also be connected to one of the bidirectional interfaces of the device 54 in order to establish a data connection with the non-PoE device 58 and connect said non-PoE device 58 to the network 50.

In other words, two separate wired connections (one for data and one for power) are required to connect the non-PoE device 58 to the device 54.

Figure 13:
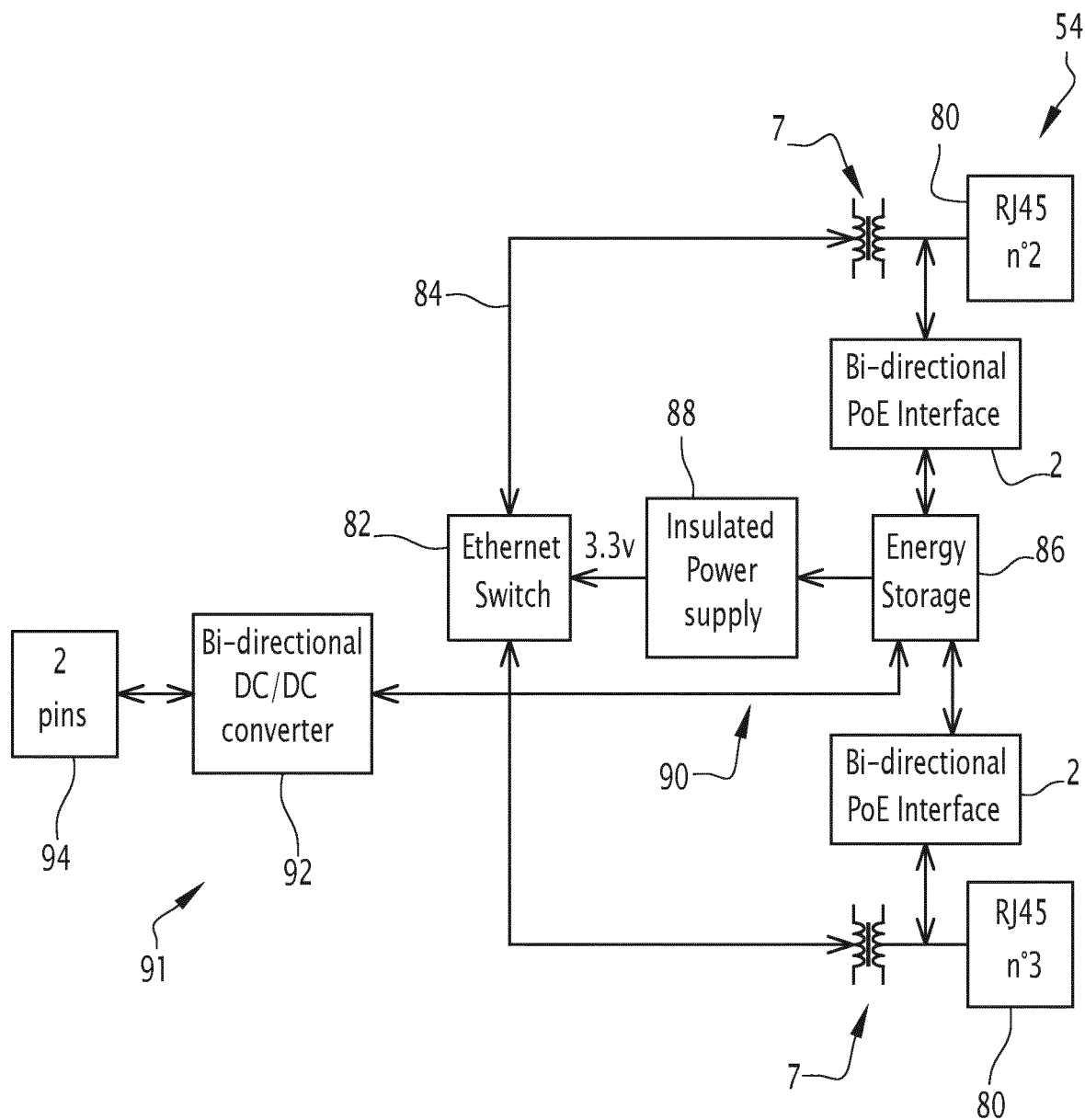
FIG. 13 is a block diagram of another embodiment of a networking device comprising a plurality of network interfaces in accordance with embodiments.

FIG. 13 is a block diagram of an exemplary network interface device 54.

According to many embodiments, construction of the second-type network interface device 54 is similar to the first-type network interface devices 52 and differs from the first-type network interface devices 52 in that one of the bidirectional interfaces is replaced by a different interface suitable only for exchanging electrical power.

For example, as with the first-type network interface devices 52, the second-type network interface device 54 comprises connectors 80 suitable to be connected to a wired data link, such as an Ethernet cable. In the illustrated example, the network interface device 54 comprises two connectors 80.

An Ethernet switch controller 82 is connected to the coupling devices 7 through internal data buses 84 and is configured to route or relay data messages between the connectors 80. Each connector 80 is also associated to a bidirectional PoE network interface 2 circuit for transferring electrical power to an internal power bus 90.

In the illustrated example, each interface 2 circuit is connected to an internal energy storage device 86, which is adapted to temporarily store electrical power and act as a buffer when power is transferred between interface circuits 2 during operation.

The device 54 may also include an insulated power supply 88 powered by the energy storage device 86 and configured to provide electrical power to the Ethernet switch controller 82. For example, the insulated power supply 88 is configured to deliver a stabilized 3.3 V DC voltage to power the Ethernet switch controller 82.

Furthermore, the device 54 comprises the aforementioned additional interface for transferring electrical power.

The additional interface 91 comprises a power converter 92 and a power connector 94.

For example, the power converter 92 may be a bi-directional DC/DC converter, such as a boost-buck converter.

The power converter 92 is connected to the connector 94 and may be connected to the internal power bus 90 and to the energy storage device 86.

The device 54 may comprise a control device, such a microcontroller, configured to automatically manage power flows between the bidirectional interfaces and the power interface.

For example, the control device may be configured to determine whether power is available on each of the bidirectional PoE interface ports and decide whether each port should be in input mode or output mode.

Similarly, the control device may be configured to determine if electrical power is available on the power interface and decide whether the power converter 92 should be set as input mode (and operate as a boost converter) or in output mode (and operate as a buck converter).

The device 54 is thus able to transfer electrical power between the bidirectional network interfaces or between the additional interface and a bidirectional interface.

Non-PoE networking devices, such as legacy devices, can then be safely connected to the network 50 along other PoE-compliant networking devices.

In many embodiments, the device 54 may include a case enclosing the various components of the device 54, such as a metal case or a molded plastic case. The case may be mounted onto a rack, for example in an electrical panel or inside a server cabinet.

In alternative embodiments, the number of connectors 80 and/or power connectors 94 could be different than in the present example, e.g. greater than two, or higher. In that case, the device 54 is modified in consequence.

Among the many advantages of the embodiments described above, the bidirectional PoE interfaces 2, 20, 30, 40 and interface devices 52, 54 enable the creation of PoE networks in which electrical power can be transferred in both directions.

Devices connected to such networks can act as Powered Devices or as Power Sourcing Equipment (i.e., they can be either powered by the network 50 or power one or more devices of the network) and can switch between these two roles during operation depending on the power requirements of the network 50.

In addition, networking devices including two or more bidirectional interfaces 2, 20, 30, 40, such as devices 52 and 54, may be used to create wired networks comprising multiple power sources and having advanced network topologies, such as a ring or a closed loop topology (e.g., a closed daisy chain topology).

This overcomes a drawback of many one-directional PoE devices and networks, in which only one power source can be allocated to each load in the network. Using multiple power sources in a same network can be beneficial as it provides a better redundancy in case of failure, such when one of the power sources fails during operation.

Another advantage of using bidirectional PoE interfaces is that rechargeable electrical sources, such as batteries, which may alternatively act as power source and power load during operation, can be connected to the network.

Figure 16:
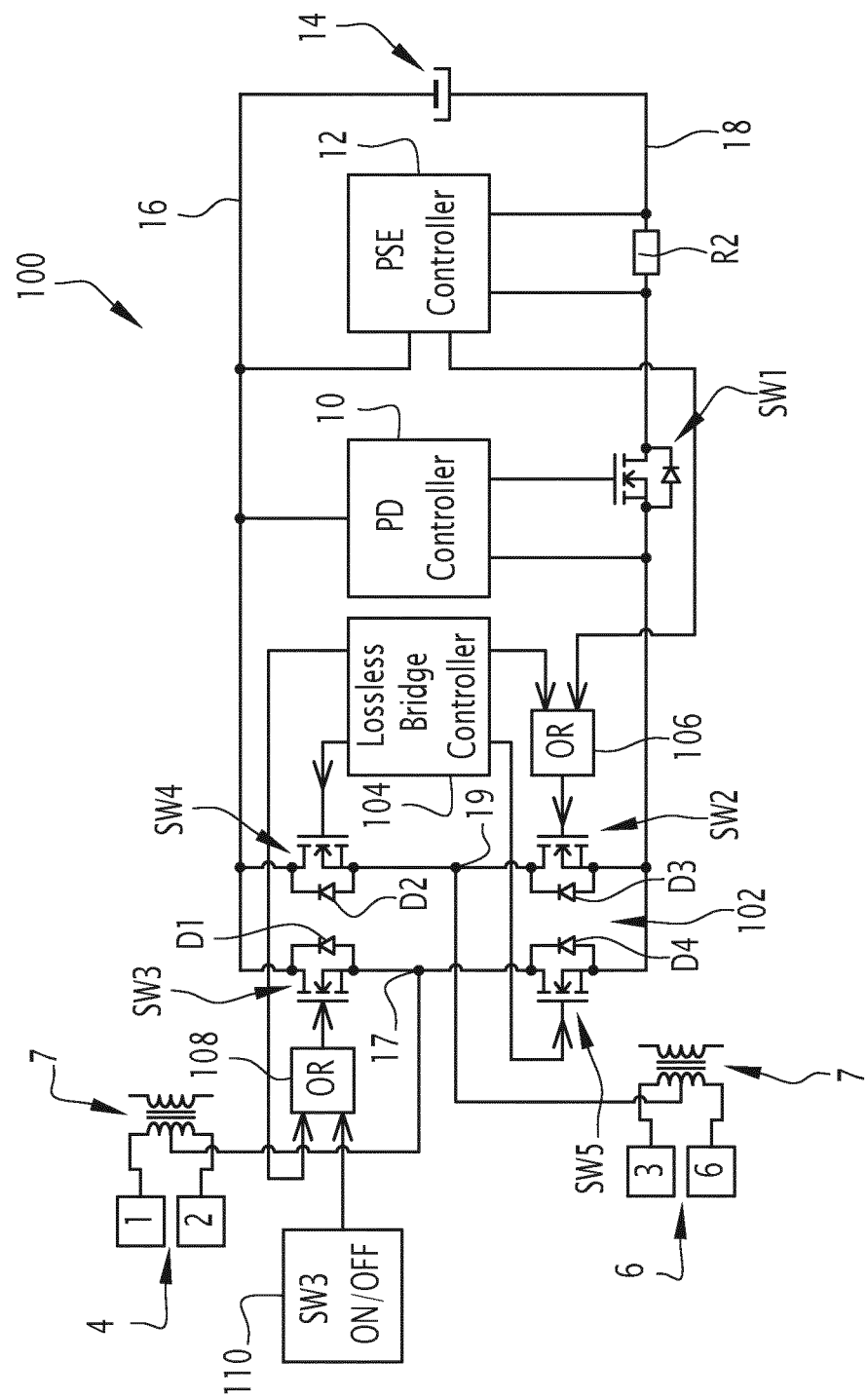
FIG. 16 is an electrical schematic diagram of a network interface apparatus in accordance with another embodiment.

Another embodiment of the bidirectional interface 2 is now described in reference to FIG. 16, which illustrates a bidirectional PoE interface 100 similar to the interface 2 described above and configured to perform a similar function, except that the diode-based rectifier 8 is replaced by an active rectifier 102.

As explained above, embodiments of the invention are not limited to a diode-based rectifier bridge. For example, diodes may be replaced by switches such as Mosfets, as this allows to reduce power losses in the diode rectifier 8.

The rectifier 102 comprises several rectifier elements, such as switches, preferably connected in a bridge arrangement.

For example, the rectifier 102 comprises input terminals 17, 19 and output terminals 16, 18 similar to the input and output terminals of the diode bridge 8 described above.

Preferably, the switches are semiconductor switches, such as Mosfets.

In many embodiments, the switches comprise the second switch SW2 and the third switch SW3 previously described and further comprise a fourth switch SW4 and a fifth switch SW5. The fourth switch SW4 is connected in parallel with (or in place of) the second diode D2 and the fifth switch SW5 is connected in parallel with (or in place of) the fourth diode D4.

Of course, in embodiments where the second and third switches SW2 and SW3 are associated to the second and fourth diode D2, D4 to begin with, then the fourth and fifth switches SW4, SW5 are connected with (or in place of) the first and third diodes D1, D3 instead.

In the illustrated example, each switch SW2, SW3, SW4 and SW5 is associated to a diode D1, D2, D3 and D4, which may be similar or identical to diodes D1, D2, D3 and D4 of the diode rectifier 8 described above.

In some embodiments in which the rectifier is based on semiconductor switches such as transistors, the rectifier may not necessarily include standalone rectifier diodes. In practice, semiconductor switches usually include an internal diode connected in parallel with the switch, such as a parasitic diode. These internal diodes may advantageously perform the same functions as diodes D1, D2, D3 and D4 and advantageously replace dedicated rectifier diodes.

The switches SW2, SW3, SW4 and SW5 of the rectifier 102 are controlled by a bridge controller 104, such as a lossless bridge controller, which may be implemented by electronic circuitry and/or by a processor-based control device.

However, in order to be able to operate the second and third switches SW2, SW3 as described above, the rectifier 102 comprises additional control circuitry coupled to the bridge controller 104 and to the second and third switches SW2, SW3. The additional control circuitry is configured to allow each of the second and third switches SW2 and SW3 to be activated either by the bridge controller 104 or by the PSE controller 12.

For example, a first logic OR gate circuit 106 is connected to a control electrode of the second switch SW2.

A first input pin of the gate circuit 106 is connected to a control output pin of the bridge controller 104 and a second input pin of the gate circuit 106 is connected to a control output pin of the PSE controller 12.

Similarly, a second logic OR gate circuit 108 is connected to a control electrode of the third switch SW3.

A first input pin of the gate circuit 108 is connected to another control output pin of the bridge controller 104 and a second input pin of the gate circuit 108 is connected to another control output pin 110 of the PSE controller 12. In other embodiments, this control output pin may be part of a control device of the interface, such as a processor or a microcontroller.

During operation, the rectifier 102 is active only when the interface 100 is acting as a load, i.e. when the PD controller 10 is activated. In order to operate the interface 100 as a power source, the rectifier 102 is switched off as soon as the PD controller 10 is switched off.

The rectifier 102 and similar embodiments can be used in place of the diode-based rectifier 8 for each of the previously described embodiments of the interface 2. This difference aside, the operation of the bidirectional interface remains the same.

The other elements of the interface 100 are the same as in the embodiments of the interface 2. These elements bear the same reference signs and are not described in detail, given that their previous description can be transposed to this embodiment.

Figure 15:
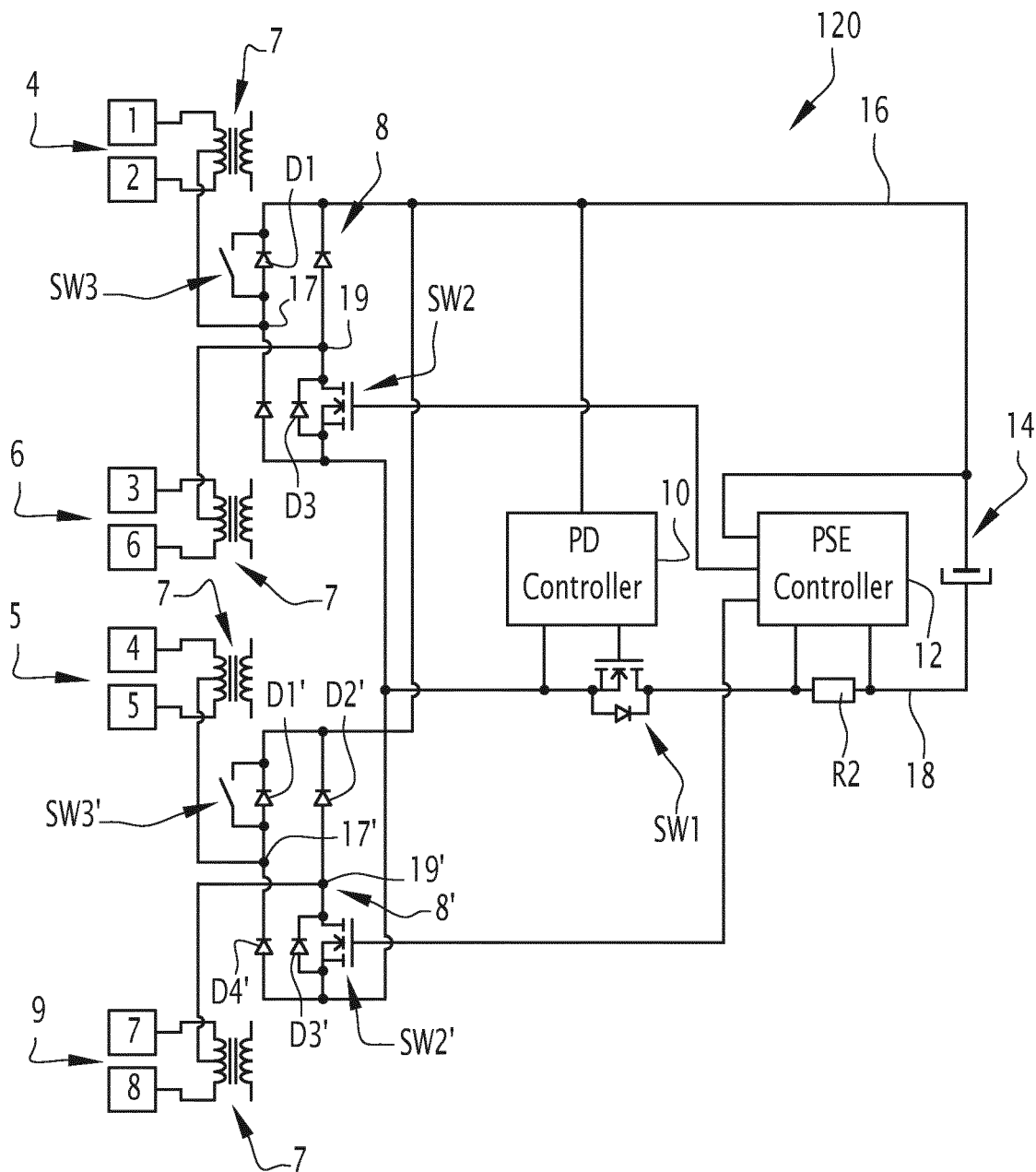
FIG. 15 is an electrical schematic diagram of a network interface apparatus in accordance with another embodiment.

Another embodiment of the bidirectional interface 2 is now described in reference to FIG. 15, which illustrates a bidirectional PoE interface 120 similar to the interface 2 described above and configured to perform a similar function. As explained above, embodiments of the invention are not limited to a connection portion comprising two pairs of pins. For example, in some embodiments, the connection portion comprises four pairs of pins and thus comprises two additional pairs of pins 5 and 9.

The pins may follow the pin numbering scheme described in the ANSI/TIA-568 standard. As described previously, the pins of the first pair of pins 4 may correspond to pins "1" and "2" while the pins of the second pair of pins 6 may correspond to pins "3" and "6". The pins of the third pair 5 correspond to pins "4" and "5" while the pins of the fourth pair of pins 9 may correspond to pins "7" and "8".

The interface 120 comprises an additional rectifier 8' associated to the two additional pairs of pins 5 and 9. Said additional rectifier 8' is preferably similar to the rectifier 8 associated to the first and second pairs of pins 4, 6.

The additional rectifier 8' comprises input terminals 17' and 19' connected to the additional pairs of pins 5 and 9. First and second output terminals of the additional rectifier 8' are respectively connected to the terminals 16 and 18.

In the illustrated example, the elements of the interface 120 which are associated to the additional pairs of pins are similar to the elements those associated to the pair of pins 4 and 6 bear the same reference signs appended with the prime "'" symbol.

The other elements of the interface 120 are the same as in the embodiments of the interface 2. These elements bear the same reference signs and are not described in detail, given that their previous description can be transposed to this embodiment.

In this specific example, the first resistor R1 is not visible on FIG. 16 because, as explained previously, said resistor R1 may be part of or integrated with the PD controller 10, as according to IEEE standards, as is the case here.

In additional embodiments, the connection portion may comprise a different number of pins, or may have a different structure (e.g., a different type of connector may be used).

In further embodiments, the rectifiers 8 and 8' can be replaced by switch-based rectifiers such as the rectifier 102 of FIG. 15.

The embodiments and alternatives described above may be combined with each other in order to create new embodiments.

The invention claimed is:

1. A network interface apparatus allowing a bidirectional transmission of electrical power along with data over a wired telecommunications network, said network interface apparatus comprising:

a connection portion adapted to connect the network interface apparatus to a wired telecommunications network;

a rectifier connected to the connection portion and comprising a plurality of rectifier elements;

a power distribution bus connected to the rectifier;

a first power controller configured to control a supply of electrical power to the power distribution bus when the network interface apparatus is powered by the wired telecommunications network;

a second power controller configured to control a supply of electrical power from the power distribution bus when the network interface apparatus is self-powered and aims to power a remote device through the wired telecommunications network;

wherein the network interface apparatus further comprises:

a first switch coupled to the first power controller and configured to selectively prevent electrical currents from flowing between the connection portion and the power distribution bus, and a second switch and a third switch each respectively coupled to the second power controller and configured to selectively prevent electrical currents from flowing from the power distribution bus to the connection portion, wherein the second switch is connected in parallel with a rectifier element of the plurality of rectifier elements of the rectifier, and wherein the third switch is connected in parallel with a second rectifier element of the plurality of rectifier elements of the rectifier.

2. The network interface apparatus of claim 1, wherein the rectifier is a diode bridge rectifier, wherein the plurality of rectifier elements are diodes, and wherein a cathode of a first diode of the diodes is connected to a first output terminal of the rectifier and an anode of the first diode is connected to a first input terminal of the rectifier.

3. The network interface apparatus according to claim 1, wherein the first switch is connected between the connection portion and the power distribution bus.

4. The network interface apparatus according to claim 1, wherein the first power controller is configured to close the first switch only when an input voltage received at the connection portion exceeds a predefined threshold.

5. The network interface apparatus according to claim 1, wherein the second power controller is configured to close the second switch and the third switch when the power distribution bus has excess power that can be delivered to a remote device through the wired telecommunications network.

6. The network interface apparatus according to claim 1, wherein the network interface apparatus further comprises an additional switch configured to selectively connect or disconnect the first power controller from the rectifier and wherein the network interface apparatus is configured to open the additional switch when the second power controller is attempting to determine electrical properties of a remote load connected to the wired telecommunications network.

7. The network interface apparatus according to claim 1, wherein the first, second and third switches are electrical switches, or transistor-based switches.

8. The network interface apparatus according to claim 1, wherein the first power controller is configured to be automatically switched into a low power consumption mode when the second power controller is attempting to determine electrical properties of a remote load.

9. A networking device comprising a plurality of network interface apparatuses according to claim 1, said networking device being configured to allow a transfer of electrical power between said network interface apparatuses whenever required.

10. The networking device of claim 9, wherein the networking device further comprises an additional interface suitable for transferring electrical power and is further configured to allow a transfer of electrical power either between the network interface apparatuses, or between the additional interface and one of said network interface apparatuses.

11. The networking device of claim 9, wherein the networking device comprises three network interface apparatuses.

12. A wired telecommunications network, comprising a plurality of networking devices, wherein at least one networking device of the plurality of networking devices comprises a network interface apparatus according to claim 1.

13. The wired telecommunications network of claim 12, wherein the wired telecommunications network has a closed ring topology.

14. The network interface apparatus of claim 1, wherein the plurality of rectifier elements comprise diodes.

15. The network interface apparatus according to claim 7, wherein the transistor-based switches comprise at least one of Mosfets, Insulated Gate Bipolar transistors or bipolar transistors.

16. The wired telecommunications network of claim 12, wherein the wired telecommunications network comprises an Ethernet network.

17. The wired telecommunications network of claim 13, wherein the closed ring topology comprises a closed daisy chain topology.

* * * * *